United States Patent [19]

Amacker

[11] 4,316,526

[45] Feb. 23, 1982

[54] APPARATUS FOR AND METHOD OF CLIMBING AN UPRIGHT COLUMNAR MEMBER

[75] Inventor: Joseph A. Amacker, Tallulah, La.

[73] Assignee: Amacker, Inc., Tallulah, La.

[21] Appl. No.: 961,640

[22] Filed: Nov. 17, 1978

Related U.S. Application Data

[63] Continuation-in-part of Ser. No. 873,285, Jan. 30, 1978, abandoned.

[51] Int. Cl.³ ..................... A47C 9/10; A01M 31/02
[52] U.S. Cl. ................................... 182/135; 182/187
[58] Field of Search ............................ 182/133–136, 182/187, 120, 121, 122

[56] References Cited

U.S. PATENT DOCUMENTS

| | | | |
|---|---|---|---|
| 3,485,320 | 12/1969 | Jones | 182/136 |
| 3,955,645 | 5/1976 | Dye | 182/135 |
| 3,960,240 | 6/1976 | Cotton | 182/187 |
| 4,137,995 | 2/1979 | Fonte | 182/136 |

OTHER PUBLICATIONS

The Rifleman published on p. 156 of Outdoor Life, Nov. 1973.

Primary Examiner—Reinaldo P. Machado
Attorney, Agent, or Firm—Wigman & Cohen

[57] ABSTRACT

An apparatus for and method of climbing an upright columnar member such as a tree, pole or the like, utilizing two climbing elements, the first climbing element having a first upright member gripping structure and a platform spaced from the upright member to accommodate the body of the user and the second climbing element having a second upright member gripping structure and a platform adjacent to the upright member to accommodate the feet of the user.

33 Claims, 7 Drawing Figures

APPARATUS FOR AND METHOD OF CLIMBING AN UPRIGHT COLUMNAR MEMBER

CROSS REFERENCE TO RELATED APPLICATION

The present application is a continuation-in-part of Design patent application Ser. No. 873,285, filed Jan. 30, 1978, now abandoned.

BACKGROUND OF THE INVENTION

1. Field of the Invention

The present invention relates to pole grasping-type climbers utilizing alternate grasping structures and, more particularly, to climbing deer stands formed of two climbing members which are alternatively raised by the user to attain a desired elevation in a tree, or on a pole or the like.

2. Description of the Prior Art

A variety of climbing stands, hunting platforms and other such climbing devices are commercially available but have been generally unsatisfactory for a number of reasons. The following is a listing of known prior art patents relating to climbing deer stands:

U.S. Pat. No. 2,879,830
U.S. Pat. No. 3,460,649
U.S. Pat. No. 3,485,320
U.S. Pat. No. 3,856,111
U.S. Pat. No. 3,885,649
U.S. Pat. No. 3,955,645
U.S. Pat. No. 3,960,240
U.S. Pat. No. 3,991,853

Tree climbing stands known from the prior art are of two basic types: those comprised of a single tree climbing frame or platform and those which employ two climbing frames or elements. Examples of both types may be seen in U.S. Pat. Nos. 3,485,320; 3,460,649; 3,856,111; 3,955,645, and 3,991,853. Generally speaking, in one way or another all of these prior art devices require the user to support his body weight by his arms and/or hands from or upon either the upper climbing element or the tree itself as the stand is raised or lowered on the tree or pole. This factor adds to the exertion required in attaining the desired elevation and is also unsafe to varying degrees.

One known climbing stand which does not require the user to support his body weight by his hands or arms while adjusting the elevation of the stand is disclosed in U.S. Pat. No. 3,960,240. However, this device requires the user to face away from the tree or pole and assume an extremely awkward and dangerous position while adjusting the upper climbing element.

In addition, once the desired elevation has been attained and the now stationary stand is in use, the prior art device typically requires that the user sit or stand with his back to the tree or pole, whether the user sits on the platform itself or on a detachable seat connected thereto. In this position the user has side support only from the tree or pole surrounding the user. However, this frame is so wide and is spaced so far from the tree or pole that the user would have difficulty bracing himself simultaneously from more than one direction, for example, while attempting to take aim with a rifle. In other known patents, the devices require the hunter to attempt to shoot while standing, sometimes in a direction past the supporting tree. Thus, these devices place the hunter in an unstable and extremely dangerous position because of the rifle recoil.

Therefore, the primary drawbacks of the prior art are the difficulty and exertion required to use them, the instability of the hunter's position, the lack of side supports after placement, and the consequent danger to the user both in placing the stand and in using the stand after placement.

SUMMARY AND OBJECTS OF THE INVENTION

In view of the foregoing limitations and shortcomings of the prior art devices, as well as other disadvantages not specifically mentioned above, it should be apparent that there still exists a need in the art for a climbing stand which is safe and simple to use, both during and after placement on the tree, pole or the like, and during the removal therefrom. It is, therefore, a primary objective of this invention to fulfill this need by providing a simple, reliable climbing stand comprised of two frame members which surround the tree, pole, etc. These frame members include platforms upon which the user can either sit or stand while facing the tree, pole, etc., and can receive continual support from the rear.

More particularly, it is an object of this invention to provide a climbing stand comprised of an upper frame member and a lower frame member. The upper frame member includes a gripping means to engage the side of the tree or pole opposite the user and further includes a platform which is spaced from the tree to accommodate the body of the user. There is also a gripping means to engage the side of the tree or pole facing the user. The lower frame member is similarly formed except that it is shorter in length than the length of the upper frame member and the platform is located adjacent the tree or pole to support the feet of the user.

It is a further object of the invention to provide support means to enable the user to support himself safely and securely when sitting on the platform of the upper frame member while raising the lower frame member by lifting his legs and feet.

It is a further object of the invention to provide a climbing stand which, when in place, offers the user side support in any direction, thus eliminating the danger of falling when the hunter is shooting from awkward positions.

It is a still further object of the invention to provide a means for adjusting the angle formed by the sitting platform with the side support bar on the upper frame member so that the seat of the user may be maintained in a level position regardless of the thickness of the tree being climbed by the user.

It is a still further object of the invention to provide a means for adjusting the angle formed by the standing platform with the side support bar on the lower frame member so that the feet of the user may be maintained in a level position regardless of the thickness of the tree being climbed by the user.

It is a still further object of this invention to provide a method of climbing a tree, pole, or the like, using the apparatus according to the present invention, which method is safe, simple, reliable, and requires a minimum of exertion by the user.

DETAILED DESCRIPTION OF A PREFERRED EMBODIMENT

Figure 2:
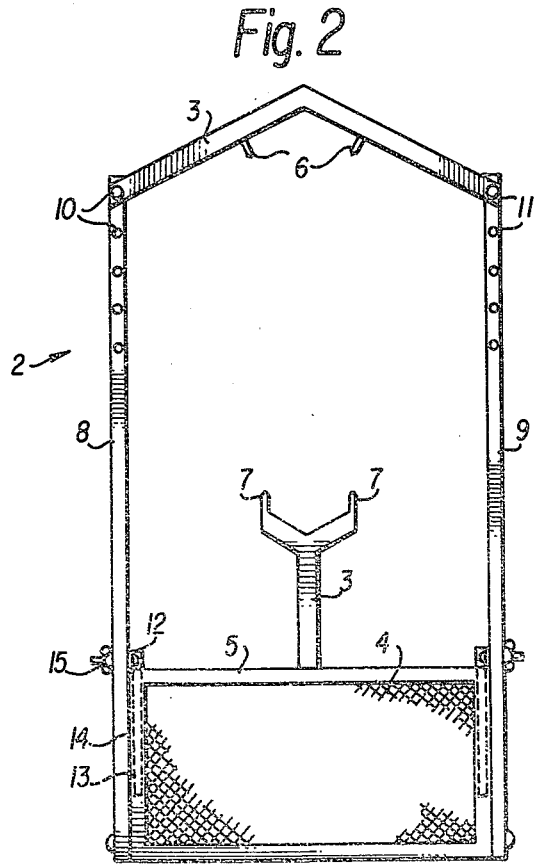
FIG. 2 is a top plan view of the first climbing element of the embodiment illustrated in FIG. 1.
Figure 3:
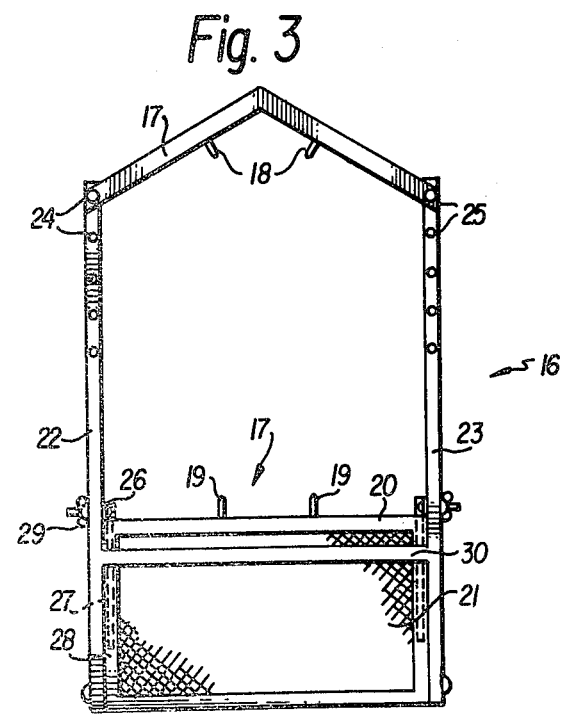
FIG. 3 is a top plan view of the second climbing element of the embodiment illustrated in FIG. 2.

A detailed description of an embodiment illustrated in FIGS. 1–3 of the drawings will now be made.

Figure 1:
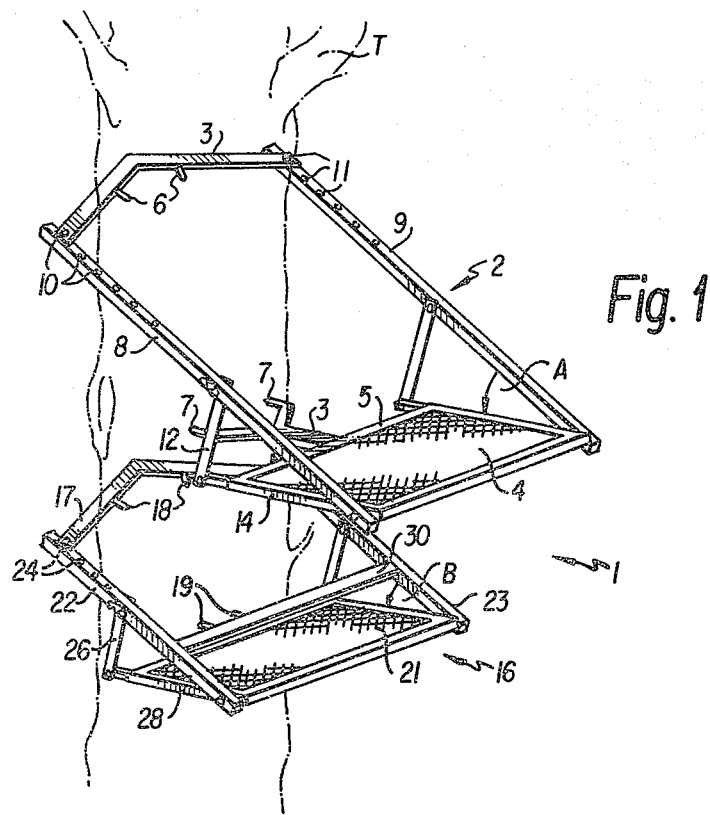
FIG. 1 is an isometric view of a preferred embodiment of the climbing deer stand of the present invention in an operating condition.

A deer climbing stand, generally noted by the reference numeral 1, is completely illustrated in FIG. 1. The deer climbing stand 1 is utilized by a hunter or another user for climbing a tree, generally designated by the reference character T in FIG. 1. Of course, the deer climbing stand 1 may be utilized for climbing other upright columnar members, such as telephone poles and the like.

The deer climbing stand 1 includes a first climbing means or upper frame member 2. This upper frame member 2 includes a first means 3 for gripping the tree T. The upper frame member 2 also includes a first platform means spaced from the tree T or other upright member. This first platform means 4 accommodates the body of the hunter or other user in the space formed between the tree T and the forward edge 5 of the first platform means 4. Thus, the space formed therebetween allows the first platform means 4 to accommodate the body of the user either in a sitting, standing, or climbing position.

The first gripping means 3 includes a first means 6 for engaging the side of the tree T opposite the hunter. The first gripping means 3 also includes a second means 7 for engaging the side of the tree T facing the hunter. Both the first engaging means 6 and the second engaging means 7 may be toothed elements, such as those illustrated in FIGS. 1–3 of the drawings. However, in states where such toothed elements are outlawed or otherwise forbidden, rigid or pivoting frictional elements may be substituted for the toothed elements in order to satisfy the laws of the particular jurisdiction.

Besides the support given to the body of the user from the rear by the first platform means 4, support for the body of the user from the side is given by a first bar means 8 and a second bar means 9 attached to the first platform means 4. The first support bar means 8 and the second support bar means 9 have means 10 and 11, respectively, for adjusting the distance of the space between the tree T and the forward edge 5 of the first platform means 4. As may be readily seen in FIGS. 1 and 2 of the drawings, the first support bar means 8 has its adjusting means 10 located on one of its ends. The adjustment of the distance between the tree T and the forward edge 5 of the first platform means 4 is carried out by setting the first engaging means 6 of the first gripping means 3 into an appropriate setting provided by a plurality of holes along each side of the support bar means 8 and 9.

The upper frame member 2 also includes a first means for adjusting an angle A formed by the first platform means 4 with the first support bar means 8. This first angle adjusting means includes an upstanding leg 12 and a first telescoping member 13 which is insertable into and out of a side edge 14 of the first platform means 4. This telescoping member 13 may be best seen in FIG. 2 of the drawings. Although this first angle adjusting means (12, 13, 14) has been described in relationship to the first platform means 4 and the first support bar means 8, there is a corresponding part of the first angle adjusting means for adjusting the same angle A between the first platform means 4 and the second side support bar means 9. The angle A is adjusted by loosening the wing nut 15 or other fastening means and inserting the telescoping member 13 into the side edge 14 of the first platform means 4 so that the telescoping member 13 is in a desired inserted position inside the side edges 14 of the first platform means 4. Thus, because the first telescoping member 13 effectively forms a variable extension of the side edge 14 of the first platform means 4, this first angle adjusting means allows the hunter or other user to maintain the first platform means 4 in a level position regardless of the thickness of the tree T. The advantage of this particular first angle adjusting means is that the hunter or other user is therefore able to always sit in a level position. Once the first platform means 4 is level, the wing nut 15 or other fastening means is retightened so that the angle A is maintained in the same position at all times.

The climbing deer stand 1 also includes a second climbing means for lower frame member 16. See FIGS. 1 and 3, in particular. The lower frame member 16 includes a second means 17 for gripping the tree T. The second gripping means 17 includes a third means 18 for engaging the side of the tree T opposite the hunter or other user and a fourth means 19 for engaging the side of the tree T facing the hunter or other user. Both the third engaging means 18 and the fourth engaging means 19 are preferably toothed elements. However, in states where the use of such toothed elements are outlawed or otherwise prohibited, rigid or pivotable frictional elements may be substituted therefor in order to comply with the laws of the particular jurisdiction. The fourth engaging means 19 is located on the forward edge 20 of a second platform means 21. This second platform means 21 is positioned adjacent to the tree T or other upright member and accommodates the feet of the hunter or other user. This second platform means 21 accommodates the feet of the hunter either in a sitting position or in a climbing position. Furthermore, this second platform means 21 may accommodate the feet of the hunter or other user in a standing position.

The lower frame member 16 further includes third and fourth means 22 and 23 for supporting the feet of the user from the side. These bar means 22 and 23 therefore help prevent the hunter or other user from accidentally stepping off the side of the second platform means 21.

These side bar means 22 and 23 include, at one end, means 24 and 25 for adjusting the distance of a space between the third engaging means 18 and the fourth engaging means 19 so that the tree T or other upright member is accommodated therebetween. The adjustment is carried out by inserting each end of the third engaging means 18 into the appropriate hole of a plurality of holes spaced along a part of the length of the bar means 22 and 23.

The lower frame member 16 further includes second means for adjusting an angle B formed by the second platform means 21 with these side support bar means 22 and 23. This second adjusting means includes an upstanding element 26 and a second telescoping member 27 fully extended from a side edge 28 of the second platform means 21. A wing nut 29 or other fastening means may be secured to the bar means 22 so that the angle B may be fixed. In order to change the angle B from 0°, this second angle adjusting means (26, 27, 28) is operated by loosening the wing nut 29 or other fastening means and by inserting the telescoping member 27 into the side edge 28 of the second platform means 21. By inserting the telescoping member 27 into the side edge 28 of the second platform means 21 into a desired inserted position, the effective length of the side edge 28 of the second platform means 21 is therefore shortened and, consequently, the angle B formed with the bar means 22 is also changed. Thus, the hunter or other user, by changing the angle B, is able to maintain the second platform means 21 in a substantially level position for accommodating his or her feet during the use of the deer climbing stand 1. By retightening the wing nut 29 or other fastening means, the hunter or other user is able to fix the second platform means 21 at the newly desired angle B. Although the angle adjusting means (26, 27, 28) has been described for forming the angle B between the side edge 28 of the second platform means 21 with the support bar means 22, an identical angle adjusting means is utilized to form the same angle B between the opposite side edge of the second platform means 21 and the support bar means 23.

The lower frame member 16 further includes a bar means 30 for lifting the second platform means 21 by the feet of the hunter or other user. This lifting bar means 30 extends between the left side support bar means 22 and the right side bar support means 23.

The preferred method of operating the climbing deer stand 1 will now be described. Before the hunter or other user may operate the deer climbing stand 1, certain preliminary steps should be taken. These preliminary steps, as well as the actual steps of operating the deer climbing stand 1, may be best understood by a study of FIGS. 4–7 of the drawings.

One preliminary step of the preferred method of operating the climbing deer stand 1 of the present invention requires adjusting the distance of the space between the third engaging means 18 and the fourth engaging means 19 so that the tree T or other upright member is accommodated therebetween. This step is accomplished by fixing the distance adjusting means 24 and 25 at the proper location along the bar means 22 and 23.

Once the tree T or other upright member is accommodated between the third engaging means 18 and the fourth engaging means 19, the angle B of the side edge 28 of the second platform means 21 may be adjusted so that the second platform means 21 is level in order to accommodate the feet of the hunter or other user in a safe or otherwise stable manner. This preliminary step of adjusting the second angle B may comprise, if necessary, the step of inserting, either partially or wholly, the second telescoping member 27 into the side edge 28 of the second platform means 21.

Once the preliminary steps relating to the lower frame member 16 have been completed, the preliminary steps relating to the upper frame member 2 may be taken. See FIG. 4 in particular.

One preliminary step relating to the upper frame member 2 requires adjusting the distance of the space between the tree T or other upright member and the forward edge 5 of the first platform means 4. This adjusting step allows the hunter or other user to accommodate his body in either a sitting, standing, or climbing position in the space between the tree T or other upright member and the forward edge 5 of the first platform means 4. If it is also necessary to do so, the hunter or other user may perform another preliminary step of adjusting the first angle A formed by the first platform means 4 with the side support bar means 8 and 9. This first angle adjusting step includes the substep of withdrawing the first telescoping member 13 from within the side edge 14 of the first platform means 4 in order to make the first platform means 4 level or substantially level in order to accommodate the hunter or other user in a sitting position.

After the preliminary steps relating to adjusting the upper frame member 2 have been completed, the actual steps employed in preferred method of climbing the tree T or other upright columnar member may be undertaken.

The first step requires the hunter or other user to step inside the space formed between the tree T or other upright member and the first platform means 4 for accommodating the body of the hunter or other user in the first climbing means or upper frame member 2. It should be pointed out at this time that, if it is preferred to do so, the preliminary steps relating to the adjustment of the upper frame member 2 may be carried out at this time.

After the hunter or other user has stepped inside the space formed between the tree T or other upright member and the first platform means 4, the hunter or other user places his or her weight on the second platform means 21 by standing thereon so that his or her feet may be accommodated on the second climbing means or lower frame member 16. Now, the hunter or other user, as illustrated in FIG. 4, is ready to begin climbing the tree T or other upright columnar member.

Figure 4:
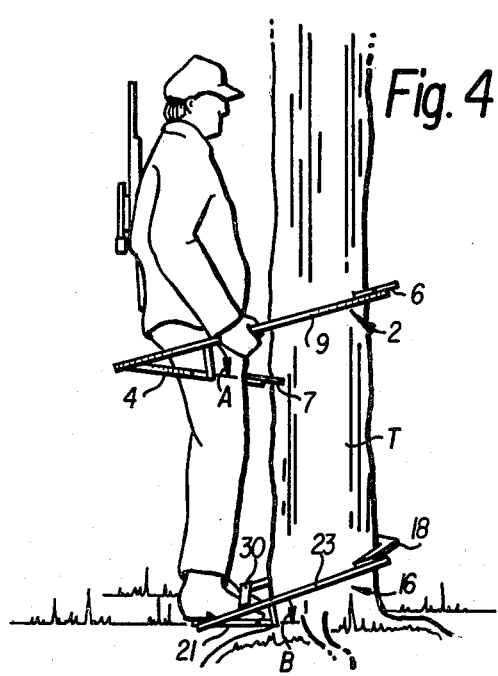
FIG. 4 illustrates the initial steps of a preferred method for operating the present invention.
Figure 5:
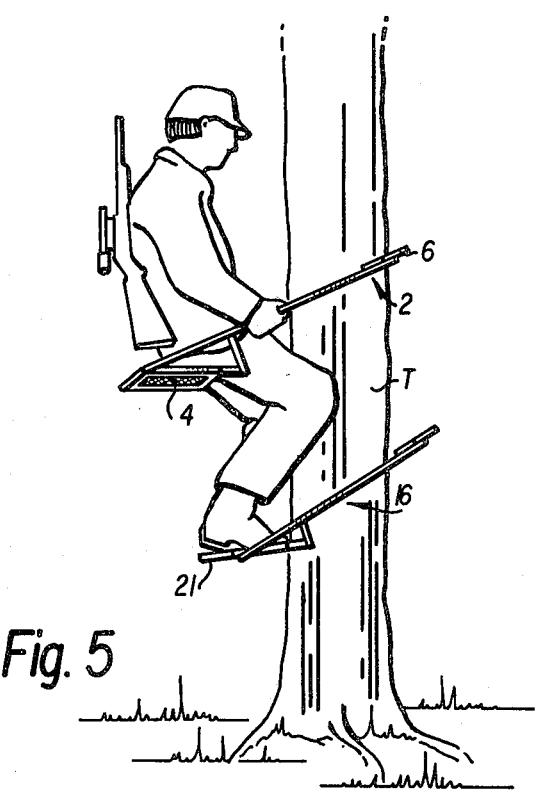
FIG. 5 illustrates the step of lifting the second climbing element along the height of the upright member in the preferred method for operating the present invention.

The next step in the preferred method of climbing the tree T or other columnar member is also illustrated in FIG. 4 of the drawings. Basically, the hunter or other user lifts the first climbing means or upper frame member 2 with his arms along the height of the tree T or other upright member and sets the first climbing means or upper frame member 2 at a first selected height of the tree T or other upright member so that the first gripping means 3 grips the tree T or other upright member. As noted hereinabove, the first gripping means 3 includes the first engaging means 6 and the second engaging means 7. This step of setting the first climbing means or the upper frame member 2 is completed by shifting the weight of the hunter or other user from the second platform means 21 to the first platform means 4 by sitting thereon.

Thereafter, the hunter or other user carries out the next step in the preferred method of climbing the tree T or other upright columnar member by lifting the second climbing means or lower frame member 16 along the height of the tree T or other upright member. This step of lifting the second climbing means or lower frame member 16 is accomplished by placing the feet of the hunter or other user under the bar means 30 for lifting the second platform means 21. Note the position of the legs of the hunter in FIG. 5 in relationship to his legs in FIG. 4.

The next step in the preferred method of climbing the tree T or other upright columnar member is setting the second climbing means or lower frame member 16 along the height of the tree T or other upright member. This step of setting the second climbing means or lower frame member 16 is completed by shifting the weight of the hunter or other user from the first platform means 4 to the second platform means 21 by standing thereon. Again, note the position of the body of the hunter illustrated in FIG. 5 in relationship to the position of the body of the hunter illustrated in FIG. 6. This shifting of the weight of the hunter or other user, by alternately standing and sitting, enables one, by way of the various gripping means, to appropriately engage and disengage the tree T or other upright columnar member.

Figure 6:
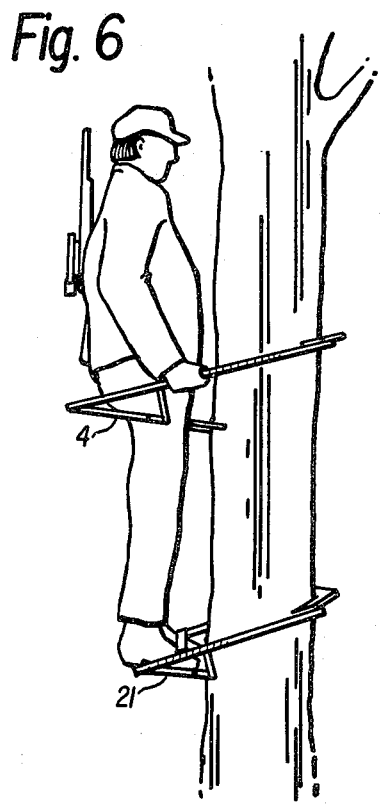
FIG. 6 illustrates the step of setting the second climbing element along the height of the upright member in the preferred method for operating the present invention.
Figure 7:
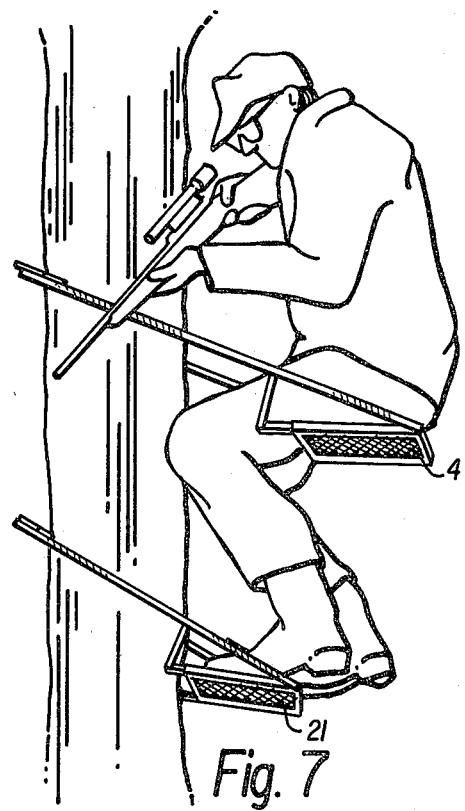
FIG. 7 illustrates the present invention in its fully operating condition for use by the hunter.

After the hunter or other user has reached a desired position along the height of the tree T or other columnar member, the hunter may stand, as he is illustrated in FIG. 6, on the second platform means 21 or he may sit down, as he is illustrated in FIG. 7, on the first platform means 4.

In order for the hunter or other user to descend from the position along the height of the tree T or other upright columnar member, it is only necessary for him or her to reverse the aforementioned steps carried out in the preferred method of climbing the tree T or other upright columnar member.

Athough only preferred embodiments of the apparatus and the method are specifically illustrated and described herein, it will be appreciated that many modifications and variations of the present invention are possible in light of the above teachings and are within the purview of the appended claims without departing from the spirit and intended scope of the present invention.

I claim:

1. An apparatus for climbing upright columnar members comprising:
   first climbing means including first means for gripping an upright member and a first platform means, said first platform means spaced from said upright member, accommodating the body of the user;
   second climbing means including second means for gripping the upright member and a second platform means, adjacent to said upright member, for accommodating the feet of the user;
   the first climbing means further including first and second bar means for supporting the body of the user from the side;
   the first climbing means further including first means for adjusting an angle formed by the first platform means with the first and second support bar means; and
   the first angle adjusting means including first telescoping members positioned within side edges of the first platform means.

2. Apparatus according to claim 1, wherein the first platform means accommodates the body of the user in a sitting position.

3. Apparatus according to claims 1 or 2, wherein the second platform means accommodates the feet of the user in a sitting position.

4. Apparatus according to claim 1, wherein the first platform means accommodates the body of the user in a climbing position.

5. Apparatus according to claims 1 or 4, wherein the second platform means accommodates the feet of the user in a climbing position.

6. Apparatus according to claim 1, wherein the second platform means accommodates the feet of the user in a standing position.

7. Apparatus according to claim 1, wherein the first gripping means includes first means for engaging the side of the upright member opposite the user.

8. Apparatus according to claim 7, wherein the first gripping means includes second means for engaging the side of the upright member facing the user.

9. Apparatus according to claim 8, wherein the first and second engaging means are toothed elements.

10. Apparatus according to claim 1, wherein the second gripping means includes third means for engaging the side of the upright member opposite the user.

11. Apparatus according to claim 10, wherein the second gripping means includes fourth means for engaging the side of the upright member facing the user.

12. Apparatus according to claim 11, wherein the third and fourth engaging means are toothed elements.

13. Apparatus according to claim 9, wherein the second gripping means includes third means for engaging the side of the upright member opposite the user.

14. Apparatus according to claim 13, wherein the second gripping means includes fourth means for engaging the side of the upright member facing the user.

15. Apparatus according to claim 14, wherein the third and fourth engaging means are toothed elements.

16. Apparatus according to claim 1, wherein the second climbing means further includes a bar means for lifting the second platform means by the feet of the user.

17. Apparatus according to claim 1, wherein the second climbing means further includes third and fourth bar means for supporting the feet of the user from the side.

18. Apparatus according to claim 17, wherein the second climbing means further includes second means for adjusting an angle formed by the second platform means with the third and fourth support bar means.

19. Apparatus according to claim 7, wherein the first climbing means further includes means for adjusting the distance of a space between the upright member and a forward edge of the first platform means.

20. Apparatus according to claim 11, wherein the second climbing means further includes means for adjusting the distance of a space between the third engaging means and the fourth engaging means so that the upright member is accommodated therebetween.

21. An apparatus for climbing upright columnar members comprising:
   first climbing means including first means for gripping an upright member and a first platform means, said first platform means spaced from said upright member, accomodating the body of the user;
   second climbing means including second means for gripping the upright member and a second platform means, adjacent to said upright member, for accommodating the feet of the user;
   wherein the first platform means supports the body of the user from the rear;
   wherein the first climbing means further includes first and second bar means for supporting the body of the user from the side;
   wherein the first climbing means further includes first means for adjusting an angle formed by the first platform means with the first and second support bar means; and wherein the first angle adjusting means includes first telescoping members positioned within side edges of the first platform means.

22. An apparatus for climbing upright columnar members comprising:
   first climbing means including first means for gripping an upright member and a first platform means, said first platform means spaced from said upright member, accomodating the body of the user;
   second climbing means including second means for gripping the upright member and a second platform means, adjacent to said upright member, for accommodating the feet of the user;
   wherein the first platform means supports the body of the user from the rear;
   wherein the first climbing means further includes first and second bar means for supporting the body of the user from the side;
   wherein the second climbing means further includes third and fourth bar means for supporting the feet of the user from the side;
   wherein the second climbing means further includes second means for adjusting an angle formed by the second platform means with the third and fourth support bar means; and
   wherein the second angle adjusting means includes second telescoping members positioned within side edges of the second platform means.

23. Method of climbing an upright columnar member, comprising the steps of:
   a. stepping inside a space between the upright member and a first platform means for accommodating the body of the user in a first climbing means;
   b. placing the weight of the user on a second platform means for accommodating the feet of the user on a second climbing means;
   c. lifting the first climbing means along the height of the upright member;
   d. setting the first climbing means at a first selected height of the upright member so that a first gripping means grips the upright member;
   e. lifting the second climbing means along the height of the upright member;
   f. setting the second climbing means at a second selected height of the upright member so that a second gripping means grips the upright member;
   g. adjusting a first angle formed by the first platform means with first and second bar means for supporting the body of the user from the side; and
   h. inserting first telescoping members into side edges of the first platform means.

24. Method according to claim 23, wherein the step of setting the first climbing means is accomplished by shifting the weight of the user from the second platform means to the first platform means.

25. Method according to claim 24, wherein the step of lifting the second climbing means is accomplished by placing the feet of the user under a bar means for lifting the second platform means.

26. Method according to claim 25, wherein the step of setting the second climbing means is accomplished by shifting the weight of the user from the first platform means to the second platform means.

27. Method according to claim 23, further comprising the step of adjusting the distance of the space between the upright member and a forward edge of the first platform means.

28. Method according to claim 23, further comprising the step of adjusting a second angle formed by the second platform means with third and fourth bar means for supporting the feet of the user from the side.

29. Method according to claim 23, further comprising the step of adjusting the distance of a space between two means for engaging the upright member therebetween.

30. Method of climbing an upright columnar member, comprising the steps of:
   a. stepping inside a space between the upright member and a first platform means for accommodating the body of the user in a first climbing means;
   b. placing the weight of the user on a second platform means for accommodating the feet of the user on a second climbing means;
   c. lifting the first climbing means along the height of the upright member;
   d. setting the first climbing means at a first selected height of the upright member so that a first gripping means grips the upright member;
   e. lifting the second climbing means along the height of the upright member;
   f. setting the second climbing means at a second selected height of the upright member so that a second gripping means grips the upright member;
   g. adjusting the distance of the space between the upright member and a forward edge of the first platform means;
   h. adjusting a first angle formed by the first platform means with first and second bar means for supporting the body of the user from the side; and
   i. inserting first telescoping members into side edges of the first platform means.

31. Method according to claim 30, further comprising the step of adjusting the distance of a space between two means for engaging the upright member therebetween.

32. Method of climbing an upright columnar member, comprising the steps of:
   a. stepping inside a space between the upright member and a first platform means for accommodating the body of the user in a first climbing means;
   b. placing the weight of the user on a second platform means for accommodating the feet of the user on a second climbing means;
   c. lifting the first climbing means along the height of the upright member;
   d. setting the first climbing means at a first selected height of the upright member so that a first gripping means grips the upright member;
   e. lifting the second climbing means along the height of the upright member;
   f. setting the second climbing means at a second selected height of the upright member so that a second gripping means grips the upright member;
   g. adjusting the distance of the space between the upright member and a forward edge of the first platform means;
   h. adjusting a first angle formed by the first platform means with first and second bar means for supporting the body of the user from the side;
   i. adjusting a second angle formed by the second platform means with third and fourth bar means for supporting the feet of the user from the side; and
   j. inserting second telescoping members into side edges of the second platform means.

33. Method according to claim 32, further comprising the step of adjusting the distance of a space between two means for engaging the upright member therebetween.

* * * * *